(12) United States Patent
Aaltonen et al.

(10) Patent No.: US 8,406,792 B2
(45) Date of Patent: Mar. 26, 2013

(54) MESSAGE MODIFICATION SYSTEM AND METHOD

(75) Inventors: Janne Aaltonen, Turku (FI); Markku Brummer, Espoo (FI); Janne Kalliola, Espoo (FI)

(73) Assignee: Apple Inc., Cupertino, CA (US)

( * ) Notice: Subject to any disclaimer, the term of this patent is extended or adjusted under 35 U.S.C. 154(b) by 1103 days.

(21) Appl. No.: 11/888,880

(22) Filed: Aug. 2, 2007

(65) Prior Publication Data
US 2008/0125096 A1    May 29, 2008

(30) Foreign Application Priority Data

Nov. 27, 2006 (GB) .................................. 0623571.7
Apr. 20, 2007 (GB) .................................. 0707711.8

(51) Int. Cl.
*H04W 4/00* (2009.01)
(52) U.S. Cl. ..................... 455/466; 455/412.2; 455/566; 705/14.64; 705/14.4; 705/14.1
(58) Field of Classification Search ................. 455/466, 455/412.1, 412.2, 414.4, 422.1, 566; 709/206, 709/207; 705/14.1, 14.16, 14.4, 14.49, 14.64
See application file for complete search history.

(56) References Cited

U.S. PATENT DOCUMENTS

| | | | |
|---|---|---|---|
| 5,408,519 A | 4/1995 | Pierce et al. | |
| 5,613,213 A | 3/1997 | Naddell et al. | |
| 5,678,179 A | 10/1997 | Turcotte et al. | |
| 5,974,398 A | 10/1999 | Hanson | |
| 5,978,775 A | 11/1999 | Chen | |
| 5,978,833 A | 11/1999 | Pashley et al. | |
| 6,006,197 A | 12/1999 | d'Eon et al. | |
| 6,009,410 A | 12/1999 | LeMole et al. | |
| 6,015,344 A | 1/2000 | Kelly | |

(Continued)

FOREIGN PATENT DOCUMENTS

DE    199 41 461 A1    3/2001
DE    19941461    3/2001

(Continued)

OTHER PUBLICATIONS

Invitation to Pay Additional Fees and Communication Relating to the Results of the Partial International Search dated Apr. 18, 2008 in corresponding International Application PCT/GB2007/050723.

(Continued)

*Primary Examiner* — Marcos Torres
(74) *Attorney, Agent, or Firm* — Novak Druce Connolly Bove + Quigg LLP (57) ABSTRACT

A method of, and system for, performing message modification on the basis of group membership of the sender and/or recipient of the message. The system includes a device which modifies a message for transmission through a data communications network. The message includes transmission data which identifies a sending party and a recipient of the message and a message body identifying content thereof, at least part of which is specified by the sending party. The system includes a data processor device arranged to identify membership of a group in relation to a sending party and a recipient of a the message, identify an action in dependence on concordance between respective group memberships, modify the message on the basis of the identified action; and transmit the modified message to the recipient in accordance with the transmission data.

38 Claims, 4 Drawing Sheets

U.S. PATENT DOCUMENTS

| | | |
|---|---|---|
| 6,023,700 A | 2/2000 | Owens et al. |
| 6,057,872 A | 5/2000 | Candelore |
| 6,097,942 A | 8/2000 | Laiho |
| 6,202,086 B1 | 3/2001 | Maruyama et al. |
| 6,286,005 B1 | 9/2001 | Cannon |
| 6,334,145 B1 | 12/2001 | Adams et al. |
| 6,345,279 B1 | 2/2002 | Li et al. |
| 6,381,465 B1 | 4/2002 | Chern et al. |
| 6,446,261 B1 | 9/2002 | Rosser |
| 6,564,261 B1 | 5/2003 | Gudjonsson |
| 6,598,228 B2 | 7/2003 | Hejna |
| 6,647,269 B2 | 11/2003 | Hendrey et al. |
| 6,684,249 B1 | 1/2004 | Frerichs et al. |
| 6,698,020 B1 | 2/2004 | Zigmond et al. |
| 6,718,551 B1 | 4/2004 | Swix et al. |
| 6,820,204 B1 | 11/2004 | Desai |
| 6,889,054 B2 | 5/2005 | Himmel et al. |
| 6,920,326 B2 | 7/2005 | Agarwal et al. |
| 7,039,599 B2 | 5/2006 | Merriman et al. |
| 7,072,947 B1 | 7/2006 | Knox et al. |
| 7,076,445 B1 | 7/2006 | Cartwright |
| 7,136,871 B2 | 11/2006 | Ozer et al. |
| 7,149,537 B1 | 12/2006 | Kupsh et al. |
| 7,155,243 B2 | 12/2006 | Baldwin et al. |
| 7,200,633 B2 | 4/2007 | Sekiguchi et al. |
| 7,263,535 B2 | 8/2007 | Malik |
| 7,280,818 B2 | 10/2007 | Clayton |
| 7,280,979 B1 | 10/2007 | Katz |
| 7,346,630 B2 | 3/2008 | Eichstaedt et al. |
| 7,386,485 B1 | 6/2008 | Mussman |
| 7,558,559 B2 | 7/2009 | Alston |
| 7,660,859 B2 | 2/2010 | MacBeth et al. |
| 7,730,017 B2 | 6/2010 | Nance et al. |
| 7,730,149 B2 | 6/2010 | Aaltonen |
| 7,734,632 B2 | 6/2010 | Wang |
| 7,774,419 B2 | 8/2010 | Aaltonen |
| 7,856,413 B2 | 12/2010 | Cradick et al. |
| 7,873,708 B2 | 1/2011 | Durand et al. |
| 7,925,283 B2 | 4/2011 | Smith et al. |
| 7,933,799 B2 | 4/2011 | Aaltonen et al. |
| 7,974,988 B2 | 7/2011 | Nandiwada et al. |
| 7,979,314 B2 | 7/2011 | Ulenas |
| 8,046,810 B2 | 10/2011 | Srivastava |
| 8,086,476 B2 | 12/2011 | Baur et al. |
| 8,099,325 B2 | 1/2012 | Gangadharpalli |
| 8,099,490 B2 | 1/2012 | Deakin |
| 2001/0047272 A1 | 11/2001 | Frietas et al. |
| 2001/0051925 A1 | 12/2001 | Kang |
| 2002/0004743 A1 | 1/2002 | Kutaragi |
| 2002/0026356 A1 | 2/2002 | Bergh |
| 2002/0029249 A1 | 3/2002 | Campbell et al. |
| 2002/0032602 A1 | 3/2002 | Lanzillo, Jr. et al. |
| 2002/0046341 A1 | 4/2002 | Kazaks |
| 2002/0052788 A1 | 5/2002 | Perkes |
| 2002/0077130 A1 | 6/2002 | Owensby |
| 2002/0083411 A1 | 6/2002 | Bouthors et al. |
| 2002/0099842 A1 | 7/2002 | Jennings et al. |
| 2002/0111177 A1 | 8/2002 | Castres |
| 2002/0128908 A1 | 9/2002 | Levin et al. |
| 2002/0137507 A1 | 9/2002 | Winkler |
| 2002/0138291 A1 | 9/2002 | Vaidyanathan et al. |
| 2002/0138400 A1 | 9/2002 | Kitchen |
| 2002/0161770 A1 | 10/2002 | Shapiro et al. |
| 2003/0003935 A1 | 1/2003 | Vesikivi et al. |
| 2003/0023489 A1 | 1/2003 | McGuire et al. |
| 2003/0028597 A1 | 2/2003 | Salmi |
| 2003/0032409 A1 | 2/2003 | Hutcheson et al. |
| 2003/0037103 A1 | 2/2003 | Salmi |
| 2003/0040297 A1 | 2/2003 | Pecen et al. |
| 2003/0040300 A1 | 2/2003 | Bodic et al. |
| 2003/0083931 A1 | 5/2003 | Lang |
| 2003/0126079 A1 | 7/2003 | Roberson |
| 2003/0154300 A1 | 8/2003 | Mostafa |
| 2003/0182567 A1 | 9/2003 | Barton et al. |
| 2003/0188017 A1 | 10/2003 | Nomura |
| 2003/0191689 A1 | 10/2003 | Bosarge et al. |
| 2003/0197719 A1 | 10/2003 | Lincke et al. |
| 2003/0220946 A1 | 11/2003 | Malik |
| 2004/0003398 A1 | 1/2004 | Donian et al. |
| 2004/0019637 A1 | 1/2004 | Goodman |
| 2004/0043777 A1 | 3/2004 | Brouwer et al. |
| 2004/0054576 A1 | 3/2004 | Kanerva et al. |
| 2004/0068435 A1 | 4/2004 | Braunzell |
| 2004/0103157 A1 | 5/2004 | Requena et al. |
| 2004/0107256 A1 | 6/2004 | Odenwald |
| 2004/0128353 A1 | 7/2004 | Goodman |
| 2004/0133480 A1 | 7/2004 | Domes |
| 2004/0136358 A1 | 7/2004 | Hind et al. |
| 2004/0158612 A1 | 8/2004 | Concannon |
| 2004/0158858 A1 | 8/2004 | Paxton et al. |
| 2004/0185883 A1 | 9/2004 | Rukman |
| 2004/0192359 A1 | 9/2004 | McRaild et al. |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0240649 A1 | 12/2004 | Goel |
| 2004/0254993 A1 | 12/2004 | Mamas |
| 2004/0254994 A1 | 12/2004 | Diorio et al. |
| 2004/0259526 A1 | 12/2004 | Goris et al. |
| 2005/0004840 A1 | 1/2005 | Wanninger et al. |
| 2005/0010641 A1 | 1/2005 | Staack |
| 2005/0033700 A1 | 2/2005 | Vogler |
| 2005/0060425 A1 | 3/2005 | Yeh et al. |
| 2005/0119936 A1 | 6/2005 | Buchanan |
| 2005/0125397 A1 | 6/2005 | Gross et al. |
| 2005/0160165 A1 | 7/2005 | Chen |
| 2005/0170856 A1* | 8/2005 | Keyani et al. ................. 455/466 |
| 2005/0192008 A1 | 9/2005 | Desai |
| 2005/0228739 A1 | 10/2005 | Leibowitz |
| 2005/0233776 A1 | 10/2005 | Allen |
| 2005/0249216 A1 | 11/2005 | Jones |
| 2005/0273833 A1 | 12/2005 | Soinio |
| 2005/0281237 A1 | 12/2005 | Heinonen et al. |
| 2005/0289113 A1 | 12/2005 | Bookstaff |
| 2006/0031164 A1 | 2/2006 | Kim |
| 2006/0031327 A1 | 2/2006 | Kredo |
| 2006/0041470 A1 | 2/2006 | Filho et al. |
| 2006/0053208 A1 | 3/2006 | Laurila |
| 2006/0053225 A1 | 3/2006 | Poikselka |
| 2006/0075425 A1 | 4/2006 | Koch et al. |
| 2006/0095511 A1 | 5/2006 | Munarriz et al. |
| 2006/0123014 A1 | 6/2006 | Ng |
| 2006/0129455 A1 | 6/2006 | Shah |
| 2006/0141923 A1* | 6/2006 | Goss ........................... 455/3.01 |
| 2006/0161599 A1 | 7/2006 | Rosen |
| 2006/0168616 A1 | 7/2006 | Candelore |
| 2006/0190331 A1 | 8/2006 | Tollinger et al. |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0206586 A1 | 9/2006 | Ling et al. |
| 2006/0212583 A1 | 9/2006 | Beadle |
| 2006/0240850 A1 | 10/2006 | Kaplan |
| 2006/0253327 A1 | 11/2006 | Morris et al. |
| 2006/0276170 A1 | 12/2006 | Radhakrishnan et al. |
| 2006/0276213 A1 | 12/2006 | Gottschalk et al. |
| 2006/0282328 A1 | 12/2006 | Gerace et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0004333 A1 | 1/2007 | Kavanti |
| 2007/0004380 A1 | 1/2007 | Ylikoski |
| 2007/0011344 A1 | 1/2007 | Paka et al. |
| 2007/0027760 A1 | 2/2007 | Collins et al. |
| 2007/0033104 A1 | 2/2007 | Collins et al. |
| 2007/0047523 A1 | 3/2007 | Jiang |
| 2007/0061195 A1 | 3/2007 | Liu et al. |
| 2007/0066295 A1 | 3/2007 | Wennberg |
| 2007/0072631 A1 | 3/2007 | Mock et al. |
| 2007/0074262 A1 | 3/2007 | Kikkoji et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1* | 4/2007 | Levkovitz et al. ............ 709/246 |
| 2007/0094066 A1 | 4/2007 | Kumar et al. |
| 2007/0100653 A1 | 5/2007 | Ramer |

| | | | | | | |
|---|---|---|---|---|---|---|
| 2007/0100805 A1 | 5/2007 | Ramer et al. | | EP | 1303107 | 4/2003 |
| 2007/0105536 A1 | 5/2007 | Tingo, Jr. | | EP | 1324250 | 7/2003 |
| 2007/0113243 A1 | 5/2007 | Brey | | EP | 1 365 604 A2 | 11/2003 |
| 2007/0117571 A1 | 5/2007 | Musial | | EP | 1365604 | 11/2003 |
| 2007/0136457 A1 | 6/2007 | Dai et al. | | EP | 1 408 705 A1 | 4/2004 |
| 2007/0149208 A1 | 6/2007 | Syrbe et al. | | EP | 1408705 | 4/2004 |
| 2007/0174295 A1 | 7/2007 | Abraham et al. | | EP | 1455511 | 9/2004 |
| 2007/0192409 A1 | 8/2007 | Kleinstern et al. | | EP | 1455511 A1 | 9/2004 |
| 2007/0214470 A1 | 9/2007 | Glasgow et al. | | EP | 1509024 | 2/2005 |
| 2007/0226097 A1 | 9/2007 | Keechle | | EP | 1 542 482 A2 | 6/2005 |
| 2007/0260624 A1 | 11/2007 | Chung et al. | | EP | 1542482 | 6/2005 |
| 2007/0288950 A1 | 12/2007 | Downey et al. | | EP | 1 587 332 A1 | 10/2005 |
| 2007/0290787 A1* | 12/2007 | Fiatal et al. ................ 340/2.1 | | EP | 1587332 | 10/2005 |
| 2008/0004046 A1 | 1/2008 | Mumick et al. | | EP | 1594287 | 11/2005 |
| 2008/0013537 A1 | 1/2008 | Dewey et al. | | EP | 1 615 455 A1 | 1/2006 |
| 2008/0032703 A1 | 2/2008 | Krumm et al. | | EP | 1613102 | 1/2006 |
| 2008/0032717 A1 | 2/2008 | Sawada et al. | | EP | 1615455 | 1/2006 |
| 2008/0057920 A1 | 3/2008 | Pettit | | EP | 1 633 100 A1 | 3/2006 |
| 2008/0065491 A1 | 3/2008 | Bakman | | EP | 1633100 | 3/2006 |
| 2008/0070579 A1 | 3/2008 | Kankar et al. | | EP | 1 677 475 A1 | 7/2006 |
| 2008/0071875 A1 | 3/2008 | Koff et al. | | EP | 1677475 | 7/2006 |
| 2008/0071929 A1 | 3/2008 | Motte et al. | | FR | 2867931 | 9/2005 |
| 2008/0082686 A1 | 4/2008 | Schmidt et al. | | GB | 2343051 | 4/2000 |
| 2008/0086369 A1 | 4/2008 | Kiat et al. | | GB | 2352856 | 2/2001 |
| 2008/0091796 A1 | 4/2008 | Story | | GB | 2356777 | 5/2001 |
| 2008/0109519 A1 | 5/2008 | Aaltonen | | GB | 2 369 218 A | 5/2002 |
| 2008/0140508 A1 | 6/2008 | Anand et al. | | GB | 2369218 | 5/2002 |
| 2008/0215436 A1 | 9/2008 | Roberts | | GB | 2383149 | 6/2003 |
| 2008/0228568 A1 | 9/2008 | Williams et al. | | GB | 2386509 | 9/2003 |
| 2008/0235342 A1 | 9/2008 | Aaltonen | | GB | 2 406 996 A | 4/2005 |
| 2008/0243619 A1 | 10/2008 | Sharman et al. | | GB | 2406996 | 4/2005 |
| 2008/0244024 A1 | 10/2008 | Aaltonen | | GB | 2407002 | 4/2005 |
| 2008/0249832 A1 | 10/2008 | Richardson et al. | | GB | 2 414 621 A2 | 11/2005 |
| 2008/0271068 A1 | 10/2008 | Ou et al. | | GB | 2414621 | 11/2005 |
| 2008/0319836 A1 | 12/2008 | Aaltonen et al. | | GB | 2416887 | 2/2006 |
| 2009/0006194 A1 | 1/2009 | Sridharan et al. | | GB | 2424546 | 9/2006 |
| 2009/0029721 A1 | 1/2009 | Doraswamy | | JP | 2002140272 | 5/2002 |
| 2009/0049090 A1 | 2/2009 | Shenfield et al. | | JP | 2007-087138 A | 4/2007 |
| 2009/0063249 A1 | 3/2009 | Tomlin et al. | | JP | 2007087138 | 4/2007 |
| 2009/0106111 A1 | 4/2009 | Walk et al. | | JP | 2007-199821 A | 8/2007 |
| 2009/0125377 A1 | 5/2009 | Somji et al. | | WO | 89/10610 | 11/1989 |
| 2009/0132395 A1 | 5/2009 | Lam et al. | | WO | 96/24213 | 8/1996 |
| 2009/0141875 A1 | 6/2009 | Demmitt | | WO | WO 96/24213 | 8/1996 |
| 2009/0197619 A1 | 8/2009 | Colligan et al. | | WO | 97/33421 | 9/1997 |
| 2009/0216847 A1 | 8/2009 | Krishnaswamy et al. | | WO | 98/37685 | 8/1998 |
| 2009/0275315 A1 | 11/2009 | Alston | | WO | WO 00/44151 A2 | 7/2000 |
| 2009/0286520 A1 | 11/2009 | Nielsen et al. | | WO | 00/70848 | 11/2000 |
| 2009/0298423 A1 | 12/2009 | Bratu et al. | | WO | WO 01/22748 A1 | 3/2001 |
| 2010/0010887 A1 | 1/2010 | Karlin et al. | | WO | 01/31497 | 5/2001 |
| 2010/0082397 A1 | 4/2010 | Blegen | | WO | WO 01/31497 A1 | 5/2001 |
| 2010/0082423 A1 | 4/2010 | Nag et al. | | WO | WO 01/52161 A2 | 7/2001 |
| 2010/0088152 A1 | 4/2010 | Bennett | | WO | 01/55892 | 8/2001 |
| 2010/0114654 A1 | 5/2010 | Lukose et al. | | WO | 01/58178 | 8/2001 |
| 2010/0125505 A1 | 5/2010 | Puttaswamy | | WO | WO 01/57705 A1 | 8/2001 |
| 2010/0138271 A1 | 6/2010 | Henkin | | WO | WO 01/58178 A2 | 8/2001 |
| 2010/0161424 A1 | 6/2010 | Sylvain | | WO | 01/65411 | 9/2001 |
| 2010/0169157 A1 | 7/2010 | Muhonen et al. | | WO | 01/71949 | 9/2001 |
| 2010/0169176 A1 | 7/2010 | Turakhia | | WO | 01/72063 | 9/2001 |
| | | | | WO | WO 01/65411 A1 | 9/2001 |
| FOREIGN PATENT DOCUMENTS | | | | WO | WO 01/69406 A1 | 9/2001 |
| DE | 10061984 | 6/2002 | | WO | WO 01/71949 | 9/2001 |
| DE | 10061984 A1 | 6/2002 | | WO | WO 01/72063 A1 | 9/2001 |
| EP | 0831629 | 3/1998 | | WO | 01/77840 | 10/2001 |
| EP | 1043905 | 10/2000 | | WO | 01/78425 | 10/2001 |
| EP | 1 073 293 A1 | 1/2001 | | WO | 01/91400 | 11/2001 |
| EP | 1 109 371 A2 | 6/2001 | | WO | WO 01/91400 A3 | 11/2001 |
| EP | 1107137 | 6/2001 | | WO | 01/93551 | 12/2001 |
| EP | 1109371 | 6/2001 | | WO | 01/97539 | 12/2001 |
| EP | 1161093 | 12/2001 | | WO | WO 01/93551 A2 | 12/2001 |
| EP | 1182845 | 2/2002 | | WO | WO 01/97539 A3 | 12/2001 |
| EP | 1193955 | 4/2002 | | WO | 02/09431 | 1/2002 |
| EP | 1195701 | 4/2002 | | WO | WO 02/31624 A2 | 4/2002 |
| EP | 1 220 132 A2 | 7/2002 | | WO | 02/35324 | 5/2002 |
| EP | 1220132 | 7/2002 | | WO | 02/44834 | 6/2002 |
| EP | 1 239 392 A2 | 9/2002 | | WO | 02/50632 | 6/2002 |
| EP | 1239392 | 9/2002 | | WO | WO 02/054803 A1 | 7/2002 |
| EP | 1239395 | 9/2002 | | WO | 02/059720 | 8/2002 |
| EP | 1253542 | 10/2002 | | WO | 02/069651 | 9/2002 |
| EP | 1298945 | 4/2003 | | WO | 02/075574 | 9/2002 |

| | | |
|---|---|---|
| WO | WO 02/069585 A2 | 9/2002 |
| WO | WO 02/069651 A1 | 9/2002 |
| WO | WO 02/075574 A1 | 9/2002 |
| WO | 02/080595 | 10/2002 |
| WO | 02/086664 | 10/2002 |
| WO | WO 02/084895 A1 | 10/2002 |
| WO | 02/100121 | 12/2002 |
| WO | WO 03/015430 A1 | 2/2003 |
| WO | WO 03/019845 A2 | 3/2003 |
| WO | WO 03/024136 A1 | 3/2003 |
| WO | 03/038638 | 5/2003 |
| WO | 03/049461 | 6/2003 |
| WO | WO 03/049461 A2 | 6/2003 |
| WO | 03/058458 | 7/2003 |
| WO | 03/073304 | 9/2003 |
| WO | WO 03/088690 A1 | 10/2003 |
| WO | 2004/034671 | 4/2004 |
| WO | 2004/054205 | 6/2004 |
| WO | 2004/057578 | 7/2004 |
| WO | 2004/084532 A1 | 9/2004 |
| WO | 2004/093044 | 10/2004 |
| WO | WO 2004/086791 A1 | 10/2004 |
| WO | WO 2004/100470 A1 | 11/2004 |
| WO | WO 2004/100521 A1 | 11/2004 |
| WO | WO 2004/102993 A1 | 11/2004 |
| WO | 2004/114109 | 12/2004 |
| WO | WO 2004/104867 A2 | 12/2004 |
| WO | 2005/015806 | 2/2005 |
| WO | 2005/020578 | 3/2005 |
| WO | WO 2005/029769 A1 | 3/2005 |
| WO | 2005/062637 | 7/2005 |
| WO | WO 2005/076650 A1 | 8/2005 |
| WO | WO 2006/002869 A1 | 1/2006 |
| WO | WO 2006/005001 A2 | 1/2006 |
| WO | 2006/011164 | 2/2006 |
| WO | 2006/016189 | 2/2006 |
| WO | WO 2006/016189 A1 | 2/2006 |
| WO | 2006/026505 | 3/2006 |
| WO | WO 2006/027407 A1 | 3/2006 |
| WO | 2006/040749 | 4/2006 |
| WO | WO 2006/040749 A1 | 4/2006 |
| WO | 2006/093284 | 9/2006 |
| WO | WO 2006/093284 A1 | 9/2006 |
| WO | 2006/105202 | 10/2006 |
| WO | 2006/110446 | 10/2006 |
| WO | WO 2006/119481 A2 | 11/2006 |
| WO | 2007/001118 | 1/2007 |
| WO | 2007/031708 | 3/2007 |
| WO | 2007/056698 | 5/2007 |
| WO | WO 2008/013437 A1 | 1/2008 |
| WO | 2008/024852 | 2/2008 |
| WO | 2008/045867 | 4/2008 |
| WO | WO 2008/045867 A1 | 4/2008 |
| WO | 2008/053062 | 5/2008 |
| WO | 2008/147919 | 12/2008 |
| WO | WO 2008/147919 A1 | 12/2008 |
| WO | 2009/009507 | 1/2009 |
| WO | 2009/061914 | 5/2009 |
| WO | 2009/077888 | 6/2009 |
| WO | 2009/099876 | 8/2009 |
| WO | 2009/158097 | 12/2009 |

OTHER PUBLICATIONS

"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010).

"Combined Search and Examination Report under Sections 17 and 18(3)", U.K. Patent Office in related U.K Application No. GB 0818647.0, Jan. 7, 2009.

"Communication (Communication Pursuant to Article 94(3) EPC)", European Patent Office in connection with related European Patent Application No. 07822138.9 on Mar. 8, 2010 (3 pages).

"Communication (European Search Report)", European Patent Office in counterpart European Patent Application EP 08156763, Oct. 17, 2008.

"Communication (International Search Report along with Written Opinion of International Searching Authority)", International Searching Authority in counterpart International Application PCT/EP2008/056342, Oct. 8, 2008.

"Communication (Search Report under Section 17 along with Examination Report under Section 18(3)", United Kingdom Intellectual Property Office in counterpart U.K. Application GB 08094321.3, Oct. 6, 2008.

"Communication Pursuant to Article 94(3) EPC dated Aug. 13, 2009", issued by the European Patent Office in related European Patent Application No. 07802544.2 (4 pages).

"Communication Pursuant to Article 94(3) EPC dated Nov. 21, 2008", issued in connection with counterpart European Application No. 08802544.2.

"Communication Pursuant to Article 94(3) EPC dated Oct. 30, 2009", European Patent Application No. 08166443.5 (1 page).

"Communication pursuant to Article 94(3) EPC issued Jan. 14, 2011", European Patent Office in related European Application No. 08761022.6 (6 pages).

"Declaration of Non-Establishment of International Search Report", mailed Feb. 27, 2009 issued by the International Searching Authority in related International Application PCT/EP2008/063712 (3 pages).

"ETSI TS 100 900 V7.2.0 (Jul. 1999):", Digital Cellular Telecommunication System (Phase 2+); Alphabets and language-specific information (GSM 03.38 Version 7.2.0 Release 1998), European Telecommunications Standards Institute 1999.

"Extended European Search Report dated Mar. 17, 2008", EP Application No. 08101544.8.

"International Preliminary Report on Patentability and Written Opinion", International Application PCT/EP2008/056342 (7 page), Nov. 24, 2009.

"International Preliminary Report on Patentability and Written Opinion mailed Jan. 7, 2010", International Application PCT/EP2008/057880 (8 page).

"International Search Report (Form PCT/ISA/210) mailed Feb. 7, 2008", issued in connection with corresponding International Application PCT /EP 2007/058243.

"International Search Report and Written Opinion mailed Jan. 14, 2010", International Search Report mailed Jan. 14, 2010 in related International Application PCT/EP2009/062713.

"Notice of Allowance", U.S. Patent Office in U.S. Appl. No. 11/888,850 (11 pages), Apr. 2, 2010.

"Office Action dated Apr. 15, 2010", U.S. Patent Office in connection with related U.S. Appl. No. 12/077,045 (14 pages).

"Office Action dated Feb. 2, 2009", issued in related U.S. Appl. No. 12/075,853.

"Office Action dated Feb. 5, 2009", U.S. Appl. No. 12/077,089.

"Office Action dated Mar. 3, 2009", issued in related U.S. Appl. No. 12/075,862 (24 pages).

"Office Action dated Mar. 31, 2010", U.S. Patent Office in connection with U.S. Appl. No. 12/077,089 (7 pages).

"Office Action dated Sep. 3, 2009", issued in related U.S. Appl. No. 12/075,862 (19 pages).

"Office Action from the USPTO dated Jun. 4, 2009", in related U.S. Appl. No. 11/888,446 (43 pages).

"Office Action issued by USPTO dated Dec. 23", issued in related U.S. Appl. No. 12/075,853 (9 pages).

"Office Action issued from the USPTO", U.S. Appl. No. 12/077,089, Aug. 6, 2009.

"Office Action issued from the USPTO dated Aug. 18, 2009", U.S. Appl. No. 11/888,850 (9 pages).

"Office Action issued from the USPTO dated Aug. 4, 2009", U.S. Appl. No. 12/077,045 (14 pages).

"Office Acttion issued from the USPTO dated Sep. 29, 2009", issued in related U.S. Appl. No. 12/075,853 (10 pages).

"PCT International Preliminary Report on Patentability and Written Opinion", PCT Application No. PCT/EP2007/061792 by the International Bureau of WIPO, May 5, 2009.

"PCT International search report issued in a related International Application No. PCT/EP2008/057880", Apr. 22, 2009.

"PCT International Search Report issued in related PCT Application No. PCT/EP2007/061792", International Searching Authority mailed Mar. 7, 2008.

"PCT Notification of Transmittal of the International Search Report and the Written Opinion of the International Searching Authority, or the Declaration (3 pgs), PCT International Search Report (2 pgs), and PCT Written Opinion of the International Searching", Authority (8 pgs) mailed Jun. 19, 2009 on a related foreign PCT application PCT/EP 2008/056069 issued by PCT International Searching Authority.

"PCT Written Opinion of the International Searching Authority", International Application No. PCT/EP2008/057880, Apr. 22, 2009.

"U.K Further Search Report under Section 17", U.K. Application No. GB0621874.7, Jul. 25, 2007.

"U.K. Search Report Under Section 17", U.K Application No. GB0716954.3, Jan. 2, 2008.

"U.K. Search Report under Section 17", U.K. Application No. GB0621874.7, Feb. 23, 2007.

"U.K. Search Report under Section 17 dated Apr. 17, 2007", issued in connection with corresponding U.K. Applicaiton No. GB0705651.8.

"U.K. Search Report under Section 17 dated Nov. 20, 2006", issued in connection with corresponding U.K. Application No. GB 0615833.1.

"U.K.Search Report under Section 17", U.K. Patent Application No. GB0802986.0, Jun. 26, 2008.

"UKIPO Search Report dated May 30, 2008", UK Application No. GB0802175.0, May 30, 2008.

"WAG UAProf Version Oct. 20, 2001; Wireless Application Protocol WAP-248-UAPROF-20011020-a", Wireless Application Protocol Forum, Ltd. 2001; http://www.wapforum.org/what/copyright.htm, Oct. 20, 2001.

Hillard, Dustin et al., "Improving Ad Relevance in Sponsored Search", Proceedings of the third ACM international conference on Web search and data mining, WSDM'10, Feb. 4-6, 2010, Session: Ads, pp. 361-369, ACM, New York, New York, USA, 2010., Feb. 4, 2010, 361-369.

Internet Reference, , "Specific Media Behavioral Targeting Index", Specific Media, Inc., Irvine, CA, 2010, Available online at http://www.specificmedia.com/behavioral-targeting.php.

Krallman, Schwiegelshohn Y. , "On the Design and Evaluation of Job Scheduling Algorithms", Lecture Notes in Computer Science, vol. 1659, Jan. 1, 1999, pp. 17-42 (26 pages), Jan. 1, 1999.

Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.

Regelson, Moira et al., "Predicting Click-Through Rate Using Keyword Clusters", Proceedings of the Second Workshop on Sponsored Search Auctions, EC'06, SSA2, Jun. 11, 2006, ACM, 2006.

Richardson, Matthew et al., "Predicting Clicks: Estimating the Click-Through Rate for New Ads", Proceedings of the 16th international conference on World Wide Web, Banff, Alberta, Canada, May 8-12, 2007, Session: Advertisements & click estimates, pp. 521-529, ACM, 2007., May 8, 2007, 521-529.

Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010).

* cited by examiner

MESSAGE MODIFICATION SYSTEM AND METHOD

FIELD OF THE INVENTION

The present invention relates to a method of, and system for, performing message modification on the basis of group membership of the sender and/or recipient of the message. The present invention is particularly, but not exclusively, suited to arrangements in which the provision of network services is sponsored by a party other than the group or parties involved in a given network event.

BACKGROUND INFORMATION

As is well known, communications networks provide a means for users to communicate with one or more other users. Users of a communication system are typically provided with numerous services, such as calls, data communication such as messaging and/or multimedia services, or simply provide users with a gateway to another network, such as the Internet. In relation to any one service, various communication systems, such as public switched telephone networks (PSTN), wireless communication systems, e.g. global system for mobile communications (GSM), general packet radio service (GPRS), universal mobile telecommunications system (UMTS), wireless local area network (WLAN) and so on, and/or other communication networks, such as an Internet Protocol (IP) network, may simultaneously be concerned in providing a connection. In addition communications systems can include broadcast networks such as Digital Video Broadcasting for Handheld (DVB-H), Digital Audio Broadcasting (DAB), and Digitam Multimedia Broadcast (DMB). An end-user may access a communication network by means of any appropriate communication device, such as user equipment (UE), a mobile station (MS), a cellular phone, a personal digital assistant (PDA), a personal computer (PC), or any other equipment operable according to a suitable network protocol, such as a Session Initiation Protocol (SIP) or a wireless applications protocol (WAP) or a hypertext transfer protocol (HTTP). The user equipment may support, in addition to call and network access functions, other services, such as short message service (SMS), multimedia message service (MMS), electronic mail (email), Web service interface (WSI) messaging and voice mail and one-way messages such as WAP PUSH messages.

Communications sessions involving more than two users are commonly referred to as virtual, online or group communications, and can be facilitated by services including the "push-to-talk over cellular" (PoC) service also known as the PTT (push-to-talk service), the instant messaging (IM) service, IRC ("Internet Relay Chat"), and the ICQ ("I Seek You") service. In the case of the IM service, users are allowed to send messages to one or more in a list of predetermined users (a so-called "private list") in a conversational mode, and because they are transmitted "instantly", the transfer of messages back and forth is fast enough for participants to maintain an interactive conversation. The IRC service is a system for chatting that involves a set of rules and conventions and is implemented via client/server software. An IRC client can be downloaded to a user's computer, and the client is then used to connect to an IRC server in an IRC network to start or join an IRC chat group. The fourth group messaging application, ICQ ("I Seek You"), is a client application that provides information as to which "friends" and "contacts" are also online on the Internet, pages them, and operates so as to coordinate a "chat" session with them. The IM system is similarly arranged to generate alerts whenever a member of a given private list is online.

These virtual communities are becoming increasingly important vehicles of communication and dissemination of new ideas in the online world; such communities are used not only to develop and discuss ideas voluntarily within specific interest groups but they also are of increasing value for advertisers: in essence they are word-of-mouth marketing and endorsement networks from one member to another member, and are increasingly perceived as the strongest method of marketing. Most online applications also utilize, consciously or unconsciously, the viral effects generated within these social networks and between the networks in their marketing.

In addition to virtual communities, real communities such as educational clubs, book clubs, music clubs, sports clubs, professional communities etc. provide a forum for discussion and interaction. Many such real communities have web pages to share information within their community, and access to these data is often controlled by means of membership criteria (user ID and password) for privacy reasons. Thus virtual and real communities are interrelated in so far as both require some sort of web authentication method in order to authenticate members.

Advertisers can be attracted by the ready-made and apparently auto-profiled set of recipients offered by groups, so as to share, at least in part, the costs associated with communications between the group members; however the advertisers require a degree of comfort that their targeted messages (i.e. messages containing information that matches the characteristics of the group) are reaching persons who are indeed members of a given group—essentially to ensure that the recipients match the characteristics of the targeted messages.

SUMMARY OF THE INVENTION

According to a first aspect of the invention there is provided apparatus for modifying a message for transmission through a data communications network, the message including transmission data identifying a sending party and a recipient of said message and a message body identifying content thereof, at least part of which is specified by the sending party, the apparatus comprising data processing means arranged to:
 identify membership of a group in relation to a sending party and a recipient of a said message;
 identify an action in dependence on concordance between respective group memberships;
 modify the message on the basis of the identified action; and
 transmit the modified message to the recipient in accordance with the transmission data.

Embodiments of the invention provide message modification on the basis of group membership, and essentially provide a means of selecting tags to add to a message on the basis of identified group membership. Conveniently the apparatus can comprise a storage system arranged to store a plurality of tags and index data corresponding thereto, each index data item comprising data indicative of a group membership configuration corresponding to the sending party of a message and the recipient of a message. For example: a first tag might be associated with a configuration in which the sending party and recipient are members of the same group; a second tag might be associated with a configuration in which the sending party is a member of a group but the recipient is not a member of any group; a third tag might be associated with a configuration in which the recipient is a member of a group but the sending party is not a member of any group; and a fourth tag might be associated with a configuration in which the recipient is a member of a group and the sending party is a member of a different group. In at least some arrangements the data processing means can be arranged to send a message containing the selected tag to the sending party.

Most preferably the tag includes a field in which the name of an entity, such as a sponsor of a group, is inserted once the or each group membership corresponding to the sending party/recipient has been identified. In the case of the sending party and recipient each being members of different groups, messages can be modified on the basis of a set of precedence rules which specify which of the groups should form the basis for the tag selection and message modification.

In preferred arrangements the communications network includes data storage means arranged to hold group records, each group record being indicative of network usage relating to members of the group. The data processing means can be arranged to determine whether said message falls within predetermined message transmission criteria, and to modify a group record corresponding to the group when said criteria are met. The group record can hold data indicative of an allocation of usage associated with the group, in which case the data processing means is arranged to reduce allocation associated with the group. Alternatively the data processing means is arranged to store data indicative of a charge for transmission of the message in the group record.

Preferably the data storage means is also arranged to hold subscriber records including a plurality of fields including a group field for storing data indicative of group membership of a subscriber; the group field is preferably initially empty and is populated in response to receipt of group membership data from the subscriber. In one arrangement the data processing means is arranged to request access to a remotely accessible information source on the basis of identification data; responsive to receipt of a response from the remotely accessible information source. The data processing means can perform a first storage action in respect of a response of a first type and can perform a second storage action in respect of a response of a second type. Receipt of a response of the first type from the remotely accessible information source causes the data processing means to update the group field in the subscriber record so as to indicate authenticated membership of the group identified in the received group membership data.

Thus, membership of a given subscriber in relation to a particular group is verified subsequent to the subscriber providing details of a given group of which they purport to be a member, and the subscriber record is updated to reflect the verification, or otherwise, of the asserted membership. The verified group membership can then be used to identify group membership for use in message modification according to embodiments of the invention.

In preferred arrangements the remotely accessible information source is associated with the group, meaning that usage of communications-based group services is dependent on verification, by a party corresponding to the group, of the subscriber's credentials. In one arrangement, the party might be a web server hosting group-related information that is only accessible on the basis of a bone fide password and login. Standard web login and password procedures are therefore conveniently used as a verification process in embodiments of the invention rather than (as is usual) is a process for accessing information.

In such an arrangement the data processing means can be arranged to look for cookies (a packet of data for use in sending to the web server), a web page of a predetermined format, or similar, within the response received from the web server and update the subscriber record accordingly.

The data processing means can be provided by a data processor having the requisite processing resources and configured to function as described above. Such a configuration can be provided by bespoke software components executed by the processing resources.

According to further aspects of the present invention there is provided software adapted to be executed by the data processing means to provide the functionality described above.

Further features and advantages of the invention will become apparent from the following description of preferred embodiments of the invention, given by way of example only, which is made with reference to the accompanying drawings.

DETAILED DESCRIPTION

Embodiments of the invention are concerned with modification of data messages based on group, or community, membership of the sender and receiver of the data message. The nature of this modification, and the criteria relating thereto, is described in detail later, but first a description of the infrastructure needed to support the modification will be presented.

Figure 1:
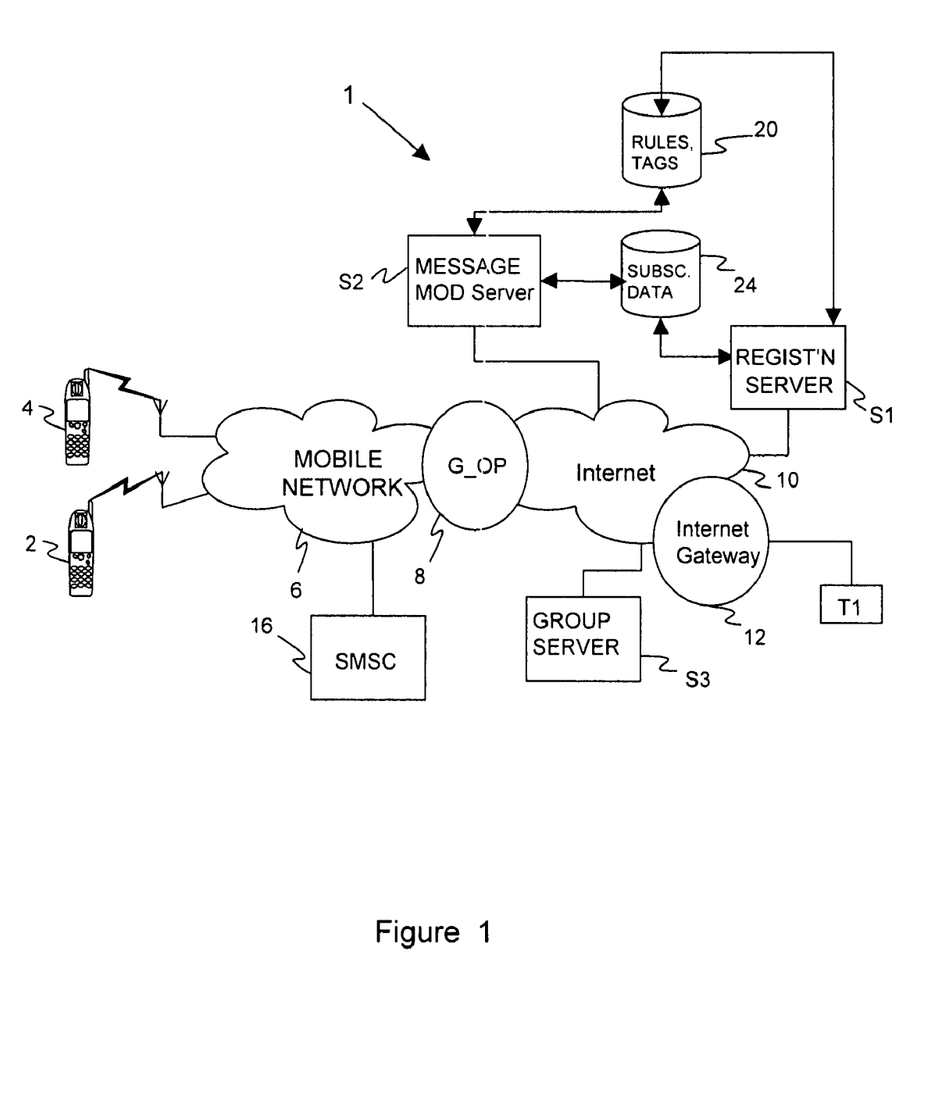
FIG. 1 is a schematic illustration of a mobile network arranged in accordance with an embodiment of the invention.
Figure 2:
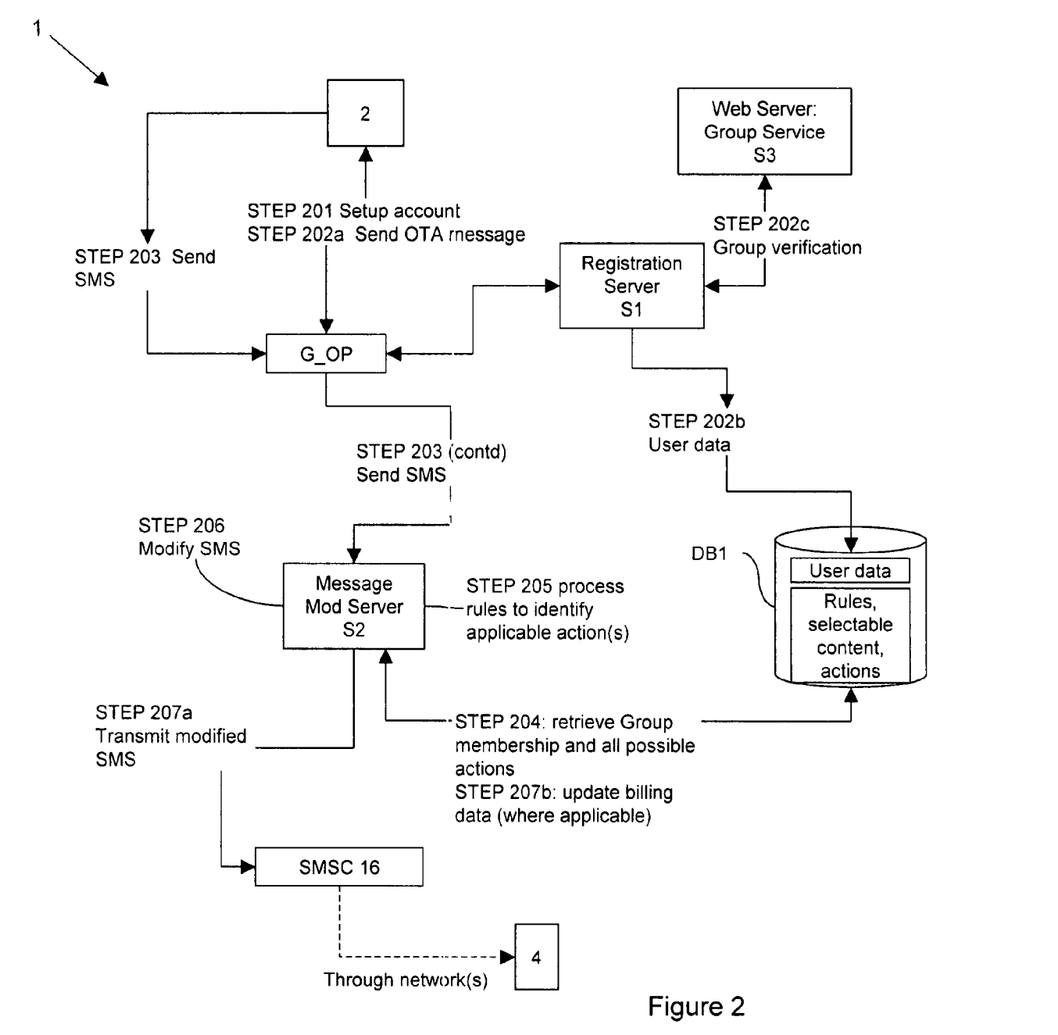
FIG. 2 is a schematic illustration of data exchanges between components of the system illustrated in FIG. 1.

FIGS. 1 and 2 show an example of a data messaging system 1 within which embodiments of the invention operate. In FIG. 2, the arrows indicate data flows within the data messaging system 1 and the blocks indicate components of the data messaging system 1. Embodiments, described herein as a message modification service, are concerned with modifications to short message service messages (SMS), but it will be appreciated that other message types, such as multimedia message service (MMS), email messages, bespoke messages in the form of GPRS data and/or streamed data and voice messages can alternatively be modified according to embodiments of the invention, and that the specific arrangement of the data messaging system 1 is dependent on the type of message being transmitted.

In the arrangement shown in FIGS. 1 and 2, a terminal 2 communicates with various network devices within the data messaging system 1 via network 6. The terminal 2 may be a wireless terminal such as a mobile phone or a PDA. The data messaging system 1 comprises a WAP gateway 8, which is typically a network operator's WAP gateway and a registration services server S1, with which the terminal 2 communicates. In addition the data messaging system 1 comprises a message modification server S2, a store-and-forward message server SMSC 16 configured to store and forward messages in accordance with conventional methods, and a database DB1, arranged to store data in respect of subscribers, terminals such as 2, and content data. The database DB1 can either be provided by a plurality of separate databases 20, 24, as shown in FIG. 1, or by a single database, as shown in FIG. 2.

In embodiments of the invention it is assumed that the user of the terminal 2 is a subscriber of the network, and that network usage is allocated, at least in part, in dependence on subscribers accepting delivery of a predetermined number and/or type of promotional messages; subscription is contingent on the subscriber entering data indicative, of their demographic data and interests, this subsequently being used, e.g. by the message modification server S2 to tailor selection of the promotional messages.

Figure 3A:
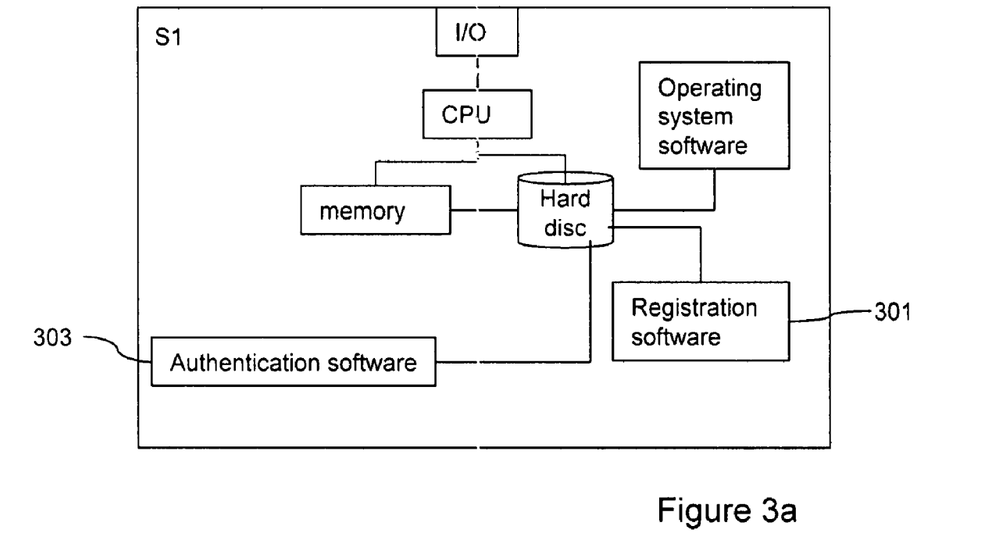
FIG. 3a is a block diagram showing components of the registration server shown in FIGS. 1 and 2.

The registration server S1 can be accessed by a user of the terminal 2 or via a terminal T1 typically connected to the Internet 10 (the terminal T1 can be e.g. a laptop computer or a personal computer fixedly attached to a network) by actuating a URL corresponding to the server S1 when entering such details; referring to FIG. 3a, in addition to standard CPU, memory, data bus, Input/Output ports, data storage, and operating system programs, the server S1 comprises registration software 301, which receives identification, group membership, demographic and preference data from the subscriber; and authentication software 303, which, as will be described in detail later, authenticates the received group membership data. Once these data have been received and, where appropriate, authenticated, a subscriber record is completed and/or updated for the subscriber and stored in the database DB1, for subsequent access by the SMSC 16 and the message modification server S2 (among other network components). The database DB1 thus holds subscriber data for each subscriber, the data identifying: the billing account to which the subscriber belongs; interests and preference data relating to the subscriber; and if the subscriber has been authenticated as belonging to a group, data identifying the group to which the subscriber belongs. In preferred embodiments of the invention the group records are initially empty, and are populated once membership of a given group has been confirmed so as to include data indicative of the type of subscription held for the group. The database DB1 is configured so that any details relating to a billing account held in the database may be retrieved by selecting the appropriate billing account, any details relating to a group held on the database may be retrieved by selecting the appropriate group, and any details relating to a particular subscriber held in the database may be retrieved by selecting the appropriate subscriber.

Broadly speaking, embodiments of the invention comprise two processes, each of which can operate independently of the other, but for illustrative purposes will herein be described together. The first process is a registration process, effected by the authentication software component 303, and which operates so as to verify group membership details entered by subscribers when providing their demographic details. The second process is a message modification process, executed by the message modification server S2, wherein messages are modified based on sender and recipient identities and their respective membership or otherwise in a given group. In a preferred arrangement the two processes are linked by the involvement of a so-called sponsor, which pays for the transmission of messages between parties contingent on their respective—and authenticated—group membership. Successful authentication according to the first (registration) process, which is itself designed to verify group membership, therefore confirms to the sponsor that discounts (by way of free or discounted messaging) are being applied correctly.

Each of these processes and the functional parts required to implement the processes will now be described, starting with the authentication process, for the case where the subscriber completes the registration process using terminal T1. Referring back to FIG. 2, at step 201 the user enters the URL corresponding to the registration server S1, which causes the registration software 301 to send a Web page from the server S1, via an Internet gateway 12, where it is modified, using conventional techniques, into a format suitable for display on the user's terminal T1, and sent to the terminal T1. The user then enters various registration details into the web page and the terminal T1 sends the details to the registration services server S1, via the gateway 8. As part of the registration process, the user enters personal information details, such as name, address, terminal details (including capabilities), sex, occupation, interests, etc. group memberships, and these details are stored, at step 202b, in the database DB1. The group membership data in respect of each group are stored in association with a respective group flag indicating authentication status thereof: the registration software 301 passes such group data to the authentication software 303 component, and in the first instance sets the status of each group flag to "unknown". The authentication software component 303 is then triggered to perform a group membership authentication process, this involving an exchange of data with the terminal T1 and the output of which results in a change to the status of the group flag (either "authenticated" or "bogus" or "undetermined").

Figure 3B:
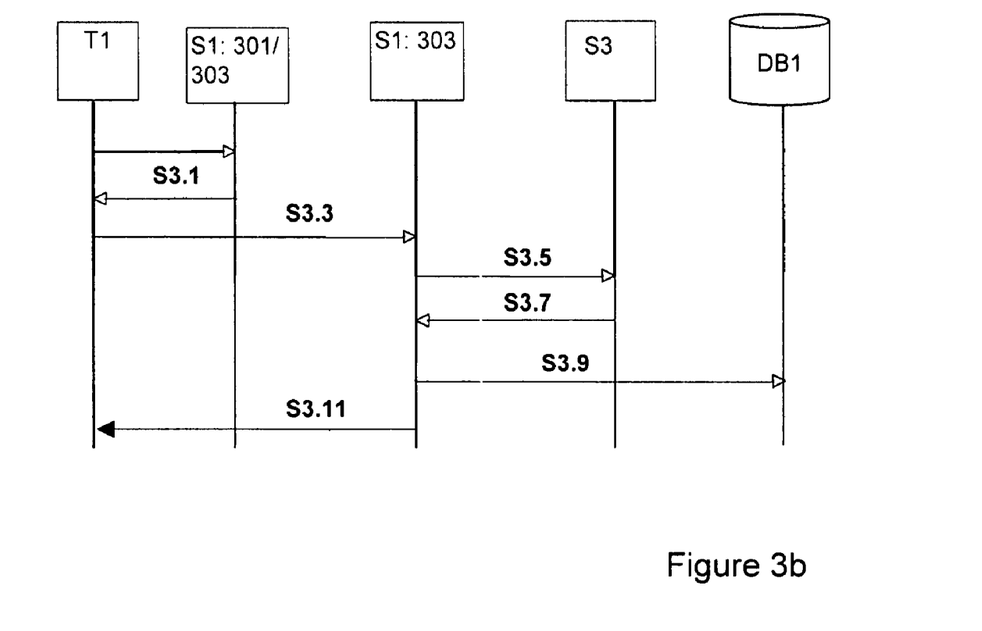
FIG. 3b is a schematic timing diagram showing messages passed between various components of the system illustrated in FIG. 1.

In one embodiment the authentication process involves the authentication software component 303 capturing respective user login details corresponding to a web-based service for the (or each) group, using these captured details to simulate a login process, and using the results thereof as the basis for updating the group flag status. Referring also to FIG. 3b, in one arrangement the authentication component 303 sends a pop-up, a frame or a bespoke login sheet to the terminal T1 (step S3.1), inviting the subscriber to enter his user ID and password; assuming these details to be duly entered, the authentication component 303 receives the entered data (step S3.3) and replicates the normal login process with a web server S3 corresponding to the group identified by the subscriber (step S3.5). As per a conventional login procedure, the group web server S3 returns data indicative either of a successful login process—in the form of a cookie, predetermined application programming interface data or a predetermined web page containing a predetermined layout or confirmation message—or of an unsuccessful login process (step S3.7). Examples of successful and unsuccessful login procedures are shown in the scripts below:

Successful
==========
Request
------
POST /config/login? HTTP/1.1
Host: login.yahoo.com
User-Agent: Mozilla/5.0 (Macintosh; U; PPC Mac OS X Mach-O; en-US; rv:1.7.3) Gecko/20040910
Accept: text/xml,application/xml,application/xhtml+xml,text/html;q=0.9,text/plain;q=0.8,image/png,*/*;q=0.5

-continued

Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Referer: https://login.yahoo.com/config/login?
Cookie: B=33f4nh50i49&b=3&s=2a
Content-Type: application/x-www-form-urlencoded
Content-Length: 279
.tries=3&.src=my&.md5=&.hash=&.js=&.last=&promo=&.intl=us&.bypass=&.partner
=&.u=25ub0q1uk6q&.v=0&.challenge=rIt9CsSjzavp3MwrRduDZy&.yplus=
&.emailCode=&pkg=&stepid=&.ev=&hasMsgr=0&.chkP=Y&.done=http%3A%2F%
2Fmy.yahoo.com&.pd=my_ver%23d0&lcgin=XXXXXX&passwd=XXXXXXX
Answer
-------
HTTP/1.x 200 OK
Date: Fri, 13 Oct 2006 08:43:19 GMT
P3P: policyref="http://p3p.yahoo.com/w3c/p3p.xml", CP="CAO DSP COR
CUR ADM DEV TAI PSA PS IVDi CONi TELo OTP DELi SAMi OTRi UNRi PUBi
IND PHY ONL UNI FIN COM NAV INT DEM CNT STA POL HEA PRE GOV"
Cache-Control: private
Pragma: no-cache
Expires: Thu, 05 Jan 1995 22:00:00 GMT
Connection: close
Transfer-Encoding: chunked
Content-Type: text/html
Set-Cookie:
F=a=SrNlnuQsvfC8VdCWs4SKlvdGqBl7owTNi8TC4cs2qNo_EhUT.JexzZ&b=afek;
expires=Thu, 15 Apr 2010 20:00:00 GMT; path=/; domain=.yahoo.com
Set-Cookie: Y=v=l&n=5lon1c961sa&l=90dd4.0jed4d/
o&p=m25kd4012000000&jb=34|26|&r=ge&lg=us&intl=us&np=1; path=/;
domain=.yahoo.com
Set-Cookie: PH=fn=xBi7MUz4jIYIJyBmw-; path=/; domain=.yahoo.com
Set-Cookie: T=z=nG1LFBnMFBGgWHDicYK5A2BjUyNTE1TzU3NTc-
&a=YAE&sk=DAAbx4xUSO.Lm&d=c2wBTlRjeESTFN0RJd01qQS0BYQFZQUUBb2sBWlcw
LQF0aXABVEZKMHlCAXp6AW5UxGQmdXQQ--; path=/; domain=.yahoo.com
Failed login:
=============
Request:
-------
POST /config/login? HTTP/1.1
Host: login.yahoo.com
User-Agent: Mozilla/5.0 (Macintosh; U; PPC Mac OS X Mach-O; en-US;
rv:1.7.3) Gecko/20040910
Accept: text/xml,application/xml,application/xhtml+xml,text/
html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Referer: https://login.yahoo.com/config/
login_verify2?.page=p1&.partner=&.intl=us&.src=my&.done=http://
my.yahoo.com
Cookie: B=33f4nh52h0i49&b=3&s=2a
Pragma: no-cache
Cache-Control: no-cache
Content-Type: application/x-www-form-urlencoded
Content-Length: 264
.tries=1&.src=my&.md5=&.hash=&.js=&.last=&promo=&.intl=us&.bypass=&.partner
=&.u=25ub0q12iuk6q&.v=0&.challenge=Mk1bieR_zKyeimTiryyrId_3Po&.yplus
=&.emailCode=&pkg=&stepid=&.ev=&hasMsgr=0&.chkP=Y&.done=http%3A%
2F%2Fmy.yahoo.com&.pd=my_ver%253d0&login=foo&passwd=foo
Answer
-------
NTTP/1.x 200 OK
Date: Fri, 13 Oct 2006 08:40:37 GMT
P3P: policyref="http://p3p.yahoo.com/w3c/p3p.xml", CP="CAO DSP COR
CUR ADM DEV PSD IVAi IVDi CONi TELo OTPi OUR DELi SAMi OTRi UNRi
PUBi IND PHY ONL UNI PUR FIN COM NAV INT DEM CNT STA POL HEA PRE GOV"
Connection: close
Transfer-Encoding: chunked
Content-Type: text/html On the basis of the response from the server S2, the authentication component 303 updates the group flag status (step S3.9); this group flag status is then subsequently used by the data message modification service according to the second aspect of the invention.

Turning now to aspects of the message modification process, in one arrangement the message modification server S2 is arranged to selectively modify messages based on respective group membership of the sender and recipient; for example, assuming a group to be tagged as sponsored by a particular third party, messages transmitted between group members are modified to include a first type of information, whereas messages transmitted from a group member to a non-group member are modified to include a second type of information. The content of the first and second types of information can be controlled by the sponsor and are preferably related in some way: for example, the first type of information could be a message stating "this message has been sponsored by XYZ", whereas the second type of information could be a message stating "this message could have been delivered free to you by XYZ if you were a member of group G1".

Figure 4:
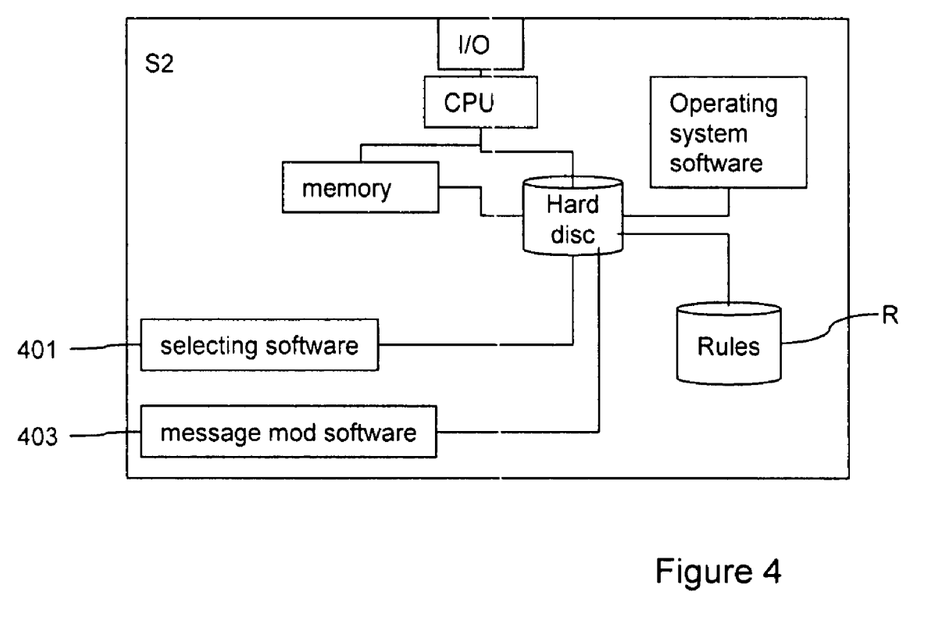
FIG. 4 is a schematic block diagram showing components of the message modification server shown in FIGS. 1 and 2.

Referring to FIG. 4, the message modification server S2 comprises standard processing components together with various bespoke message modifying components; these message modifying components include selecting software 401 and a repository of rules R, each rule specifying a set of group membership conditions and data to select for use in modifying a given message in dependence on the conditions being satisfied (whilst shown as being stored local to the server S2, the rules could be stored in the database DB1 and accessed therefrom by the selecting software 401). The server S2 also includes message modifying software 403 for modifying the incoming message so as to include the selected data, thereafter forwarding the modified messages to the SMSC 16 in accordance with standard methods.

The rules are preferably specified by the group, or by the sponsor of the group, and in one arrangement specify particular tags to apply to a message in the event that the conditions are satisfied. Examples of the conditions include:

Rule Condition(s)
R1 Sender & Recipient both members of same group
R2 Sender & Recipient both members of a group, but the groups are different
R3 Sender is a member of a group (& recipient is not)
R4 Recipient is a member of a group (& sender is not)
R5 Neither Recipient nor Sender is member of a group
R6 If Sender &/or Recipient are members of more than one group, apply inter-Group precedence rules (previously agreed between groups and managed by the data messaging server S2) to decide which of rules R particular to each of the groups should be applied.

The actions associated with these rules are specified in the form of a billing action and a message modification action. Preferably the message modification actions in respect of at least two of the rules are related: in one embodiment the action (message modification) is identical, but the content of the tags applied to modify the message are different, but related; and in another embodiment the actual actions taken in respect of different rules are different, but related. The actions are stored in the database DB1, in association with a given rule and thus a given group.

For example, the message modification actions applicable in respect of Rules R1 . . . R4 for group G1 could be as follows:

TABLE

Actions for Group G1

| Rule | Action(s) | Message Modification Tag |
|---|---|---|
| R1 | Billing Action:<br>Do not debit accounts of sender or recipient<br>Message modification actions:<br>Concatenate Tag A1 with name of sponsor & add to message received from sender (to be sent to recipient only)<br>Add/Send sponsor-selected message for G1 (to be added to message to be sent to recipient; to be sent cold to sender) [optional] | A1<br>This message was sponsored by "Sponsor" for the community G1 members |
| R2, R3 | Billing Action:<br>Debit account of recipient<br>Message modification actions:<br>Concatenate Tag A2 with name of sponsor & add concatenated tag to message received from sender and send to recipient<br>Add/Send sponsor-selected message for G1 (to be added to message to be sent to recipient; to be sent cold to sender) | A2<br>If you joined group G1 you could benefit from free text messaging thanks to "Sponsor" |
| R4 | Billing Action:<br>Debit account of sender<br>Message modification actions:<br>Concatenate Tag A2 with name of sponsor & send concatenated tag to sender<br>Add/Send sponsor-selected message for G1 (to be added to message to be sent to sender; to be added to message to be sent to recipient) [optional] | A2 (As above) |
| R5 | Billing Action:<br>Debit account of sender &/recipient<br>Message modification actions:<br>Concatenate Tag A2 with name of sponsor, add concatenated tag to message received from sender and send to recipient; send concatenated tag as cold message for sender<br>Add sponsor-selected message for G1 (to be added to message to be sent to sender; to be added to message to be sent to recipient) [optional] | A2 (As above) |

Turning back to FIG. 2, upon receipt of an SMS from a sender (step S203), the selecting software 401 identifies sender and/or recipient information from an incoming message and selects, by accessing the database DB1, the respective group membership(s), together with all associated message modification actions associated therewith (step 204). On the basis of the group memberships, the selecting software 401 identifies and processes one or more applicable rules R1 . . . Rn (step 205) in order to identify billing arrangements for the message and to determine how to modify the incoming message (step 206). After the message has been modified, the modified message is transmitted to the SMSC 16 of the licensed operator (step 207a); thereafter billing instructions are transmitted to the database DB1 for storage therein in respect of the sender/recipient/sponsor (step 207b), consistent with the billing action identified at step 205.

The foregoing can conveniently be explained by way of a couple of examples, firstly for the case where a message M1 is sent from subscriber A to subscriber B, and both A and B are determined to be members of community G1, and for which the sponsor of community G1 is Coke™. In this example the selecting software component 401 selects rule R1, particular to Group G1, which has the following output actions:

1. All text communication between community members of G1 are free;
2. Text messages should be tagged with tag A1, concatenated with the name of the sponsor (Coke™); thus in this example, the tag reads: "this message was sponsored by Coke™ for the members of community G1".

This then causes the message M1 to be modified so as to include the branded tag and is sent onto the recipient; since both A and B are members of group G1, neither of their accounts is debited for the message transmission and receipt.

In a second example, message M1 is sent from subscriber A to subscriber B; subscriber A is not a member of any community, but subscriber B is a member of group G1. Assuming for illustrative purposes the sponsor of group G1 again to be Coke™, the following output actions are generated at step 205:
1. Bill the sender of the message for the transmission to the recipient;
2. Create a message to send to the sender based on tag A2 and concatenated with the name of the sponsor (Coke™); thus in this example, the message reads: "If you joined group G1 you could benefit from free text messaging thanks to Coke™".
3. Do not bill the sender for the transmission of the tagged promotional message It will be appreciated that the content of the messages sent to the respective parties A and B is related by virtue of the identity of the group sponsor, and that the tagging and/or creation of respective messages, by the message modification server S2, is dependent on which of the sender or recipient is, or is not, a group member.

In a third example, message M1 is sent from subscriber A to subscriber B; subscriber A is a member of Group G1, but subscriber B is not a member of the same group G1. Assuming for illustrative purposes the sponsor of group G1 again to be Coke™, the following output actions are generated at step 205:
1. Do not bill the sender of the message for the transmission to the recipient;
2. Create a message to send to the recipient based on tag A2 and concatenated with the name of the sponsor (Coke™); thus in this example, the message reads: "If you joined group G1 you could also benefit from free text messaging thanks to Coke™".

In the event that both the sender and recipient are members of different groups (e.g. sender is a member of group G1 and recipient is a member of group G2), the inter-group precedence rules mentioned above in relation to rule R6 could include the following conditions:

Review sponsor data in respect of G1 & G2 to see whether they include any prestored (or shared) precedence specifications;
  Review temporal data in respect of G1 & G2 to see whether they include any prestored precedence specifications;
  If there are no prestored precedence specifications, prioritise the group associated with the sender over that associated with the recipient, and debit the account of the group sponsor corresponding to the sender;
  Shared precedence specifications might include agreed sharing of messaging costs between sponsors of particular groups, so that, in the event that the sponsors of groups G1 and G2 have an inter-group agreement, the costs of transmitting messages are shared between sponsors. In this case, the tag A2 added to messages would alert each party to the existence of the group of which the other party is a member (e.g. if sender A is a member of G1 and recipient B is a member of G2, the tag A2 added to the message sent to A would read "If you joined group G2 you could benefit from free text messaging thanks to "Sponsor2" and the tag added to the message sent to B would read "If you joined group G1 you could benefit from free text messaging thanks to "Sponsor1").

Implementation Details & Alternatives

The registration software 301, category selection software 303, authentication software 305, selecting software 401 and modifying software 403 are preferably written in the Java programming language. The server S1 could, for example, be an Apache HTTP server, and the proxy message server SMSC_1 could be a J2EE JMS Server (see http://openjms.sourceforge.net/). The registration software 301, category selection software 303 and authentication software 305 could be Java™ servlet containers configured to run within a Java platform such as Java 2 Platform Standard Edition v1.4.1 (for further information see resources available from Sun Microsystems™ e.g. at http://java.sun.com/j2se/1.4.1/and http://java.sun.com/products/servlet/index.html). The skilled person will appreciate that the software could be written in any suitable language.

As an alternative to the registration software component 301 sending a web page to the terminal T1, the terminal T1 could have, stored thereon, an application arranged to capture such demographic data (not shown in the Figures). In the case where the subscriber uses his mobile terminal 2 to communicate with the registration server S1, such an application could be stored on a SIM card, which, as is known in the art, is used for the storage and retrieval of data items by the terminal T1. The command set, data file structure and data coding format for data communicated via the interface between the terminal T1 and the SIM processor are all specified, in GSM technical specification 11.11. Alternatively the application could be transmitted to the terminal T1 (or mobile 2) (e.g. via GPRS or Bluetooth) in response to a request received by the server S1 from the terminal T1 and would be of a format suitable for cooperating with the operating system in use on the terminal T1.

Whilst authentication of a given group membership is described as being performed via login-simulation, it will be appreciated that such a method is only possible in relation to groups that are web-based; for other groups (e.g. retail establishments using loyalty cards and the like, where membership of a group can be defined on the basis of subscribers being in possession of a loyalty card and account, neither or which are managed by a user-accessible web service), membership of a given group could be established by sending of an authentication request message by the authentication software component 303 to a service associated with the retail establishment, or on the basis of previously determined authentication data that is retrievable from a third party.

In the above embodiments, message modification is performed by the message modification server S2; however, message modification could instead be performed by a proxy store and forward node (not shown), which is logically distinct from the network operator's SMSC 16. In order to ensure that messages are sent to this proxy SMSC in the first instance (and not to the network operator's SMSC) the mobile terminal 2 would require configuring with details of this proxy e.g. via an Over-The-Air (OTA) SMS settings message. In response, the operating system programs on the terminal 2 automatically configure the default SMSC settings to the network address of the proxy message server. This therefore means that any SMS messages subsequently sent from the terminal 2 will be sent to the proxy message server in the first instance. For further information regarding use of OTA protocol for the delivery of data to a WAP client from a WAP server, the reader is referred to literature available from the WAP Forum Ltd., in particular "Wireless Application Protocol, PUSH OTA Protocol Specification", published 16 Aug. 1999, available from http://www.wapforum.org/what/technical/PROP-PushOTA-19990816.pdf.

As a further alternative, the message modification process could be performed by the network operator's SMSC 16.

Whilst the above embodiments describe the messages originating from a terminal 2, the messages could instead originate from a service that may or may not also be responsible for performing modification of the message. For example such a service could include an Internet service configured to send SMS messages; group records would be created for the service as described above and accessed subsequent to, or in parallel with, message creation so as to modify the message.

Whilst the above embodiments describe transmitting messages within a mobile communications network, it is to be understood that messages can originate from and be transmitted, wholly or at least in part, within a fixed network such as the Internet.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method, comprising:
    identifying, by a computer hardware processor, the group membership conditions of a sending party and a recipient of a message;
    selecting, by the hardware processor, a rule based on the group membership conditions of the sending party and the recipient of the message, wherein the rule is specified by the identified group of the sending party and the recipient of the message and the rule dictates a billing action and a message modification tag based on the group membership condition of the sending party and the recipient of the message;
    selecting, by the hardware processor, a billing action and a message modification tag based on the predetermined rules;
    transmitting, by the hardware processor, the message to the recipient of the message, wherein the message is appended with the selected message modification tag;
    transmitting, by the hardware processor, a second message to the sending party, wherein the second message is appended with a second message modification tag specified by the selected rule; and
    billing, by the hardware processor, the sending party and the recipient of the message according to the selected billing action.

2. The method of claim 1, wherein the message modification tag and the second message modification tag are the same when the sending party and the recipient are members of the same group.

3. The method of claim 1, wherein the message modification tag and the second message modification tag are different when the sending party and the recipient are members of different groups.

4. The method of claim 1, wherein the message modification tag and the second message modification tag are the same when neither the sending party nor the recipient is a member of a group.

5. The method of claim 1, wherein the message modification tag is related to a sponsor associated with the identified group of the sending party and the recipient of the message.

6. The method of claim 1, wherein the billing action dictates a cost to the sending party and the recipient of the message for transmission of the message.

7. The method of claim 6, wherein the cost is reduced by an amount that a sponsor associated with the identified group of the sending party and the recipient is willing to subsidize the cost.

8. The method of claim 7, wherein the billing action dictates that the cost to both the sending party and the recipient is subsidized by the sponsor when both the sending party and the recipient are members of the group associated with the sponsor.

9. The method of claim 7, wherein the billing action dictates that only the cost to the member of the group associated with the sponsor is subsidized by the sponsor when only one of the sending party and the recipient is a member of the group associates with the sponsor.

10. The method claim 7, wherein the billing action dictates that the cost to the sending party and the recipient is not subsidized when neither the sending party nor the recipient is a member of the group associated with the sponsor.

11. The method of claim 8, wherein the message modification tag appended to the message indicates that the cost is subsidized by the sponsor.

12. The method of claim 9, wherein the message modification tag appended to the message indicates that only the cost to the member of the group associated with the sponsor is subsidized by the sponsor.

13. The method of claim 10, wherein the message modification tag appended to the message indicates that the sponsor subsidizes the cost of transmission for members of the group associated with the sponsor.

14. A system, comprising:
    a processor; and
    a memory containing instructions that, when executed, cause the processor to:
    identify the group membership conditions of a sending party and a recipient of a message;
    select a rule based on the group membership conditions of the sending party and the recipient of the message, wherein the rule is specified by the identified group of the sending party and the recipient of the message and the rule dictates a billing action and a message modification tag based on the group membership condition of the sending party and the recipient of the message;
    select a billing action and a message modification tag based on the predetermined rules;
    transmit the message to the recipient of the message, wherein the message is appended with the selected message modification tag;
    transmit a second message to the sending party, wherein the second message is appended with a second message modification tag specified by the selected rule; and
    bill the sending party and the recipient of the message according to the selected billing action.

15. The system of claim 14, wherein the message modification tag and the second message modification tag are the same when the sending party and the recipient are members of the same group.

16. The system of claim 14, wherein the message modification tag and the second message modification tag are different when the sending party and the recipient are members of different groups.

17. The system of claim 14, wherein the message modification tag and the second message modification tag are the same when neither the sending party nor the recipient is a member of a group.

18. The system of claim 14, wherein the message modification tag is related to a sponsor associated with the identified group of the sending party and the recipient of the message.

19. The system of claim 14, wherein the billing action dictates a cost to the sending party and the recipient of the message for transmission of the message.

20. The system of claim 19, wherein the cost is reduced by an amount that a sponsor associated with the identified group of the sending party and the recipient is willing to subsidize the cost.

21. The system of claim 14 wherein the billing action dictates that the cost to both the sending party and the recipient is subsidized by the sponsor when both the sending party and the recipient are members of the group associated with the sponsor.

22. The system of claim 20, wherein the billing action dictates that only the cost to the member of the group associated with the sponsor is subsidized by the sponsor when only one of the sending party and the recipient is a member of the group associates with the sponsor.

23. The system claim 20, wherein the billing action dictates that the cost to the sending party and the recipient is not subsidized when neither the sending party nor the recipient is a member of the group associated with the sponsor.

24. The system of claim 21, wherein the message modification tag appended to the message indicates that the cost is subsidized by the sponsor.

25. The system of claim 22, wherein the message modification tag appended to the message indicates that only the cost to the member of the group associated with the sponsor is subsidized by the sponsor.

26. The system of claim 23, wherein the message modification tag appended to the message indicates that the sponsor subsidizes the cost of transmission for members of the group associated with the sponsor.

27. A non-transitory computer-readable medium containing instructions that, when executed by a computing device, cause the computing device to:
    identify the group membership conditions of a sending party and a recipient of a message;
    select a rule based on the group membership conditions of the sending party and the recipient of the message, wherein the rule is specified by the identified group of the sending party and the recipient of the message and the rule dictates a billing action and a message modification tag based on the group membership condition of the sending party and the recipient of the message;
    select a billing action and a message modification tag based on the predetermined rules;
    transmit the message to the recipient of the message, wherein the message is appended with the selected message modification tag;
    transmit a second message to the sending party, wherein the second message is appended with a second message modification tag specified by the selected rule; and
    bill the sending party and the recipient of the message according to the selected billing action.

28. The non-transitory computer-readable medium of claim 27, wherein the message modification tag and the second message modification tag are the same when the sending party and the recipient are members of the same group.

29. The non-transitory computer-readable medium of claim 27, wherein the message modification tag and the second message modification tag are different when the sending party and the recipient are members of different groups.

30. The non-transitory computer-readable medium of claim 27, wherein the message modification tag and the second message modification tag are the same when neither the sending party nor the recipient is a member of a group.

31. The non-transitory computer-readable medium of claim 27, wherein the message modification tag is related to a sponsor associated with the identified group of the sending party and the recipient of the message.

32. The non-transitory computer-readable medium of claim 27, wherein the billing action dictates a cost to the sending party and the recipient of the message for transmission of the message.

33. The non-transitory computer-readable medium of claim 32, wherein the cost is reduced by an amount that a sponsor associated with the identified group of the sending party and the recipient is willing to subsidize the cost.

34. The non-transitory computer-readable medium of claim 33, wherein the billing action dictates that the cost to both the sending party and the recipient is subsidized by the sponsor when both the sending party and the recipient are members of the group associated with the sponsor.

35. The non-transitory computer-readable medium of claim 33, wherein the billing action dictates that only the cost to the member of the group associated with the sponsor is subsidized by the sponsor when only one of the sending party and the recipient is a member of the group associates with the sponsor.

36. The non-transitory computer-readable medium claim 33, wherein the billing action dictates that the cost to the sending party and the recipient is not subsidized when neither the sending party nor the recipient is a member of the group associated with the sponsor.

37. The non-transitory computer-readable medium of claim 34, wherein the message modification tag appended to the message indicates that the cost is subsidized by the sponsor.

38. The non-transitory computer-readable medium of claim 35, wherein the message modification tag appended to the message indicates that only the cost to the member of the group associated with the sponsor is subsidized by the sponsor.

* * * * *